Patented Dec. 28, 1948

2,457,577

UNITED STATES PATENT OFFICE 2,457,577

PRODUCTION OF LOW-METHOXYL PECTINIC ACIDS FROM ALUMINUM-PECTIN COMPOSITIONS

William D. Maclay, Berkeley, Allan D. Shepherd, El Cerrito, Rolland M. McCready, Berkeley, and Robert P. Graham, Albany, Calif., assignors to the United States of America as represented by the Secretary of Agriculture No Drawing. Application December 11, 1946, Serial No. 715,594

7 Claims. (Cl. 195—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to pectin materials and has among its objects the provision of a process for preparing pectinic acids of low methyl ester content. A further object is the preparation of such pectinic acids in concentrated form without the use of vacuum concentration or organic solvents and with a great saving in amounts of reagents necessary.

The process of preparing low-methoxyl pectinic acids from pectin is known. In the known process the de-esterification is generally carried out on the solution of pectin obtained by extraction of pectin-containing materials or on the solution containing the pectin source materials. Solutions of the former have a pectin concentration of about 0.3 to 1%. Pectin cannot be extracted from pectin-containing materials, such as citrus peel or apple pomace, in higher concentration because of the formation of very viscous solutions. Thus if it is attempted to prepare a pectin extract of concentration higher than that referred to, it is found that the resulting liquid is so viscous that it cannot be filtered and thus the undesired material (cellulose-pulp, etc.) cannot be separated. The de-esterification of pectin in such dilute solution is very wasteful of reactants. Excessive amounts of alkali or acid are necessary to bring the entire quantity of solution to the desired pH in the de-esterification and isolation steps. Further, the low-methoxyl pectinic acid product is then obtained in very low concentration and must be separated from excessive amounts of water.

It is known to carry out the de-methoxylation of pectin in more concentrated solutions but in such cases, vacuum concentration of the pectin solution was required or re-solution of dry pectin was involved.

According to the instant process, the dilute pectin extract can be used as the starting material and yet the de-methoxylation is carried out at higher concentrations. To this end, the dilute pectin extract having a concentration of about 0.3 to 1.0% pectin is treated with a soluble aluminum salt. The pH is then adjusted to 4.2 to 4.5, whereupon the pectin forms a complex with the aluminum and the complex precipitates out of solution. The precipitate is separated from the liquid phase, suspended in water, and subjected to a de-methoxylation procedure. The precipitation step involves a rapid and very economical concentration step. Thus the pectin extract may have a concentration of about 0.3 to 1%, but when the pectin-aluminum composition is suspended in water for the de-methoxylation step, only enough water is added to give an effective concentration of about 5% or above of pectin. In operating on such a concentrated composition there is a large saving in alkali and acid in the de-methoxylation and isolation steps, the low-methoxyl pectinic acid product is more easily recovered, and when precipitated from such solution has improved physical characteristics from the standpoint of increased solids content.

As has been pointed out, the process is of particular advantage when starting with a dilute pectin extract. However, the de-methoxylation of pectin-aluminum compositions is a novel step in and of itself and our invention is inclusive of de-methoxylating such compositions to produce low-methoxyl pectinic acids, regardless of how the compositions are prepared.

The pectin-aluminum composition can be de-methoxylated by an enzymic technique as will be shown hereinafter.

The step of preparing the pectin-aluminum compositions by reacting a solution of pectin with an aluminum salt is known; see, for example U. S. Patent No. 1,497,884, June 17, 1924. However, an example is submitted to illustrate the technique we found to be advantageous. It is understood that this example and those submitted hereinafter are given by way of illustration and not limitation.

*Example 1*

To 1 liter of 1% citrus pectin solution, 50 ml. of 25% $Al_2(SO_4)_3$ solution was added. After thorough stirring, 40 ml. of 4% ammonium hydroxide solution was added to give a pH of 4.2 to 4.5. The resulting precipitate of pectin-aluminum complex was strained and pressed to a solids content of 10%.

The pectin-aluminum composition prepared as in Example 1 is employed in the de-methoxylation step as illustrated by Examples 2 and 3. The pectin-aluminum composition need not necessarily be made according to the technique shown in Example 1 but can be made by any of the methods shown in the prior art.

Example 2

To 100 grams of aqueous pectin-aluminum precipitate (8.6% pectin) suspended in 275 ml. of water was added a slurry of 0.85 grams of a citrus pectin esterase preparation. The pH of the reaction mixture was 7.0. A volume of 27.3 ml. of 0.5 N-sodium hydroxide was added to the reaction mixture over a period of 65 minutes at a rate that a pH of 7.0 was maintained. Twenty-five ml. of 5 N-sulfuric acid was added to the reaction mixture to bring the pH to 1.5. The pectinic acid was drained and pressed. It was washed twice in acid solution of pH 1.0 and three times in water, the pH of the final wash being 2.2. The pectinic acid was then dried in vacuo at 65° C. for 24 hours. Methoxyl content, 2.3%.

Example 3

One hundred grams of aqueous pectin-aluminum precipitate (8.65% pectin) was suspended in 275 ml. of water. Nine grams of sodium hexametaphosphate was added and the mixture stirred to effect solution of the pectin. 0.85 gram of citrus pectin esterase preparation was added to the pectin-aluminum suspension and 0.5 N-sodium hydroxide was added at a rate such that the pH of the reaction mixture was maintained at 7.0. 33.7 ml. of alkali was added during a period of 17 minutes, at the end of which 5 N-sulfuric acid was added in an amount sufficient to lower the pH of the reaction mixture to 1.5. The pectinic acid precipitate was pressed, washed twice in aqueous acid solution of pH 1, followed by three washes with water, the final wash mixture having a pH of 2.05. The washed pectinic acid precipitate was pressed and dried in vacuo at 65° C. for 24 hours. Methoxyl content, 2.2%.

The concentration of pectin-polyvalent metal composition in the demethoxylation step may vary within wide limits. It is preferred to use concentrations equivalent to 1% or greater of pectin, particularly 3% to 10%.

Various bases, such as sodium hydroxide, potassium hydroxide, ammonium hydroxide, ammonia gas, etc., may be used to give the proper pH for the enzymic de-methoxylation. The pH should be maintained within the range of 5 to 10, preferably 7 to 9.

The temperature of de-methoxylation can be varied in the range 5° C. to 45° C. However, the best results have been obtained in the range of 25° C. to 30° C.

The aluminum salt used to form the pectin complex may be any water-soluble aluminum salt such as aluminum sulphate, aluminum chloride, aluminum nitrate, etc. Since it is not certain just what type of precipitate is formed when the pectin and aluminum salt react, the material is referred to as an "pectin-aluminum composition" in this specification. The formation of the pectin-aluminum composition is in the nature of a positively charged colloid (aluminum hydrosol) reacting with the negatively charged colloid (pectin). The large aggregates then separate from solution. The proportions of reagents and temperature are not critical; however, a pH of 4.2 to 4.5 must be maintained to get the proper precipitation.

The step of precipitating pectinic acids from solution by the addition of acid is disclosed and claimed in the application of R. M. McCready, H. S. Owens, and W. D. Maclay, Serial No. 616,445, filed Sept. 14, 1945, Patent 2,448,818.

The low-methoxyl pectinic acid products can be isolated from the reaction mixture by addition of a mineral acid as is disclosed in Examples 2 and 3. However, it is not essential to proceed in this manner; the products may be isolated by other methods known in the art. For instance, the products can be precipitated by adding alcohol—preferably in volume equal to the volume of the reaction mixture.

Where the low-methoxyl pectinic acids are isolated by addition of acid, a small amount of sodium hexametaphosphate or sodium tetraphosphate ($Na_6P_4O_{13}$) may be added during the demethoxylation step. These complex phosphates are added in small quantity (about ½ to 1% based on the amount of pectin-aluminum composition) and aid in making the reaction mixture homogeneous.

The pectinesterase can be prepared from citrus fruits, tomatoes, or molds.

Having thus described our invention, we claim:

1. A process for preparing low-methoxyl pectinic acids from a dilute aqueous solution of pectin which comprises adding to said solution a water-soluble aluminum salt, adjusting the pH of the solution to about 4.2 to 4.5 to precipitate a water-insoluble pectin-aluminum composition, separating the precipitated pectin-aluminum composition and subjecting it to the action of an enzymic demethoxylating agent to form low-methoxyl pectinic acids, and then isolating the low-methoxyl pectinic acid.

2. A process for preparing low-methoxyl pectinic acids from a 0.3% to 1.0% aqueous solution of pectin which comprises adding to said solution a water-soluble aluminum salt, adjusting the pH of the solution to about 4.2 to 4.5 to precipitate a water-insoluble pectin-aluminum composition, separating the precipitated pectin-aluminum composition and subjecting it to the action of an enzymic de-methoxylating agent to form low-methoxyl pectinic acids, and then isolating the low-methoxyl pectinic acids.

3. A process for preparing low-methoxyl pectinic acids from a dilute aqueous solution of pectin which comprises adding to said solution a water-soluble aluminum salt, adjusting the pH of the solution to about 4.2 to 4.5 to precipitate a water-insoluble pectin-aluminum composition, separating the precipitated pectin-aluminum composition, dispersing it in water, subjecting the dispersion to the action of an enzymic demethoxylating agent to form low-methoxyl pectinic acids, and then isolating the low-methoxyl pectinic acids.

4. A process for preparing low-methoxyl pectinic acids from a dilute aqueous solution of pectin which comprises adding to said solution a water-soluble aluminum salt, adjusting the pH of the solution to about 4.2 to 4.5 to precipitate a water-insoluble pectin-aluminum composition, separating the precipitated pectin-aluminum composition, dispersing it in water, subjecting the dispersion to enzymic de-methoxylation at a pH of about 7 to 9, and then isolating the low-methoxyl pectinic acids so formed.

5. A process for preparing low-methoxyl pectinic acids from a dilute aqueous solution of pectin which comprises adding to said solution a water-soluble aluminum salt, adjusting the pH of the solution to about 4.2 to 4.5 to precipitate a water-insoluble pectin-aluminum composition, separating the precipitated pectin-aluminum composition, dispersing it in water, subjecting the dispersion to de-methoxylation in the presence of pectinesterase at a pH of 7 to 9, precipitating the low-methoxyl pectinic acids so formed by the addition of a mineral acid, and then isolating the low-methoxyl pectinic acids.

6. A process for preparing low-methoxyl pectinic acids from a dilute aqueous solution of pectin which comprises adding a water-soluble aluminum salt to said solution, adjusting the pH of the solution to about 4.2 to 4.5 to precipitate a water-insoluble pectin-aluminum composition, separating the precipitated pectin-aluminum composition, dispersing it in water and subjecting said dispersion to de-methoxylation in the presence of pectinesterase and a base at a pH of about 7, precipitating the low-methoxyl pectinic acids so formed by addition of a mineral acid, and then isolating the low-methoxyl pectinic acids.

7. A process for preparing low-methoxyl pectinic acids from a dilute aqueous solution of pectin which comprises adding a water-soluble aluminum salt to said solution, adjusting the pH of the solution to about 4.2 to 4.5 to precipitate a water-insoluble pectin-aluminum composition, separating the precipitated pectin-aluminum composition, dispersing it in water and subjecting said dispersion to de-methoxylation in the presence of pectinesterase and ammonium hydroxide at a pH of about 7 at a temperature of about 25° to 30° C., precipitating the low-methoxyl pectinic acids so formed by the addition of sulphuric acid, and then isolating the low-methoxyl pectinic acids.

WILLIAM D. MACLAY.
ALLAN D. SHEPHERD.
ROLLAND M. McCREADY.
ROBERT P. GRAHAM.

REFERENCES CITED

The following references are of record in the file of this patent:

UNITED STATES PATENTS

| Number | Name | Date |
|---|---|---|
| 1,991,242 | Cole et al. | Feb. 12, 1935 |
| 2,373,729 | Willaman | Apr. 17, 1945 |
| 2,392,854 | Leo et al. | Jan. 15, 1946 |